United States Patent
Jung et al.

(10) Patent No.: US 10,838,167 B2
(45) Date of Patent: Nov. 17, 2020

(54) PHOTOGRAPHING LENS OPTICAL SYSTEM

(71) Applicant: ACE SOLUTECH CO., LTD., Sungnam-si (KR)

(72) Inventors: Pil Sun Jung, Gyeonggi-do (KR); Dong Young Kim, Gyeonggi-do (KR); Chi Ho An, Gyeonggi-do (KR)

(73) Assignee: ACE SOLUTECH CO., LTD., Sungnam-si (KR)

( * ) Notice: Subject to any disclaimer, the term of this patent is extended or adjusted under 35 U.S.C. 154(b) by 84 days.

(21) Appl. No.: 16/083,388

(22) PCT Filed: Mar. 8, 2017

(86) PCT No.: PCT/KR2017/002513
§ 371 (c)(1),
(2) Date: Sep. 7, 2018

(87) PCT Pub. No.: WO2017/155303
PCT Pub. Date: Sep. 14, 2017

(65) Prior Publication Data
US 2019/0101725 A1     Apr. 4, 2019

(30) Foreign Application Priority Data
Mar. 9, 2016     (KR) .................... 10-2016-0028086

(51) Int. Cl.
*G02B 9/60* (2006.01)
*G02B 9/58* (2006.01)
(Continued)

(52) U.S. Cl.
CPC ............. *G02B 9/60* (2013.01); *G02B 9/58* (2013.01); *G02B 13/0045* (2013.01); *G02B 13/06* (2013.01)

(58) Field of Classification Search
CPC ........................................... G02B 9/60
(Continued)

(56) References Cited

U.S. PATENT DOCUMENTS

2004/0240081 A1* 12/2004 Saito ................ G02B 9/34
359/754
2011/0316969 A1* 12/2011 Hsieh ................ G02B 13/06
348/36

(Continued)

FOREIGN PATENT DOCUMENTS

| JP | 3948041 | 7/2007 |
| JP | 2016009190 | 1/2016 |

(Continued)

OTHER PUBLICATIONS

International Search Report, International Application No. PCT/KR2017/002513, dated Jun. 7, 2017.

*Primary Examiner* — Darryl J Collins
(74) *Attorney, Agent, or Firm* — Perman & Green, LLP (57) ABSTRACT

Provided is a photographing lens optical system. The lens optical system includes a first lens, a second lens, a third lens, a fourth lens, and a fifth lens sequentially arranged from an object to an image sensor. The first lens may have a negative (−) refractive power and have an exit surface that is concave with respect to the image sensor. The lens optical system may satisfy at least one of a condition 100°<FOV<200° and a condition 1<TTL/ImgH<2. Herein, FOV denotes an angle of view of the lens optical system, TTL denotes a distance from an incidence surface of the first lens to the image sensor, and ImgH denotes a diagonal length of a maximum pixel region of the image sensor.

18 Claims, 6 Drawing Sheets

(51) Int. Cl.
   *G02B 13/06*      (2006.01)
   *G02B 13/00*      (2006.01)
(58) Field of Classification Search
   USPC .......................................................... 359/770
   See application file for complete search history.

(56)           References Cited

U.S. PATENT DOCUMENTS

2014/0268369 A1* 9/2014 Chen .................. G02B 13/0045
                                                 359/715
2015/0098137 A1* 4/2015 Chung ............... G02B 13/0045
                                                 359/714
2015/0185443 A1   7/2015 Ahn et al.
2015/0370043 A1  12/2015 Huang
2016/0065811 A1* 3/2016 Jo ...................... G02B 13/0045
                                                 348/340
2017/0176720 A1* 6/2017 Zhao .................. G02B 13/0045

FOREIGN PATENT DOCUMENTS

KR         100677055       2/2007
KR         20140056494     5/2014
KR         20150080327     7/2015

* cited by examiner

PHOTOGRAPHING LENS OPTICAL SYSTEM

CROSS REFERENCE TO RELATED APPLICATIONS

This application is the National Stage of International Application No. PCT/KR2017/002513, having an International Filing Date of 8 Mar. 2017, which designated the United States of America, and which International Application was published under PCT Article 21(2) as WO Publication No. 2017/155303 A1, which claims priority from and the benefit of Korean Patent Application No. 10-2016-0028086, filed on 9 Mar. 2016, the disclosures of which are incorporated herein by reference in their entireties.

BACKGROUND

1. Field

The present disclosure relates to an optical apparatus, and more particularly, to a lens optical system used in a camera.

2. Description of Related Art

Recently, the field of use and supply of cameras using solid-state imaging devices such as charge-coupled devices (CCDs) and complementary metal oxide semiconductor (CMOS) image sensors have been rapidly expanding. In the field of automobiles, there is a demand for cameras and optical systems for various purposes such as front monitoring, rear monitoring, lane recognition, and autonomous navigation. Also, with the development of various action cams such as drones or leisure sports camcorders, the demand for related cameras and optical systems is also increasing.

Since lens optical systems used in vehicle cameras or action cams are highly exposed to the external environment, they require high reliability. Thus, high-reliability spherical glass lenses are widely used in lens optical systems of the related art. However, since spherical glass lenses have a low degree of freedom in optical design, when the spherical glass lenses are used to construct an optical system, the number of such lenses increases and the cost thereof increases. In addition, since a large number of lenses are used, it may be difficult to achieve a compact optical system configuration. In particular, in the case of a vehicle camera or an action cam, a lens optical system with a wide angle of view may be used to perform a wide range of monitoring/photographing functions. However, according to the related art, it may be difficult to implement a miniature (or subminiature) optical system that has a short total length while having a wide angle of view.

SUMMARY

Provided is a compact lens optical system having a short total length while having a wide angle of view (or a super-wide angle of view).

Also provided is a lens optical system that may solve the limitations of spherical glass lenses of the related art by applying aspherical glass lenses.

According to an aspect of the present disclosure, a lens optical system includes: a first lens, a second lens, a third lens, a fourth lens, and a fifth lens sequentially arranged from an object to an image sensor where an image of the object is formed, wherein the first lens has a negative (−) refractive power and has an exit surface that is concave with respect to the image sensor, the second lens has a positive (+) refractive power and has an incidence surface that is convex toward the object, the third lens has a positive (+) refractive power and has an exit surface that is convex toward the image sensor, the fourth lens has a positive (+) refractive power and has an exit surface that is convex toward the image sensor, and the fifth lens has a negative (−) refractive power and has a an incidence surface that is concave with respect to the object.

The lens optical system may satisfy at least one of the following Conditions (1) to (6).

$$100° < FOV < 200°$$  Condition (1):

Here, FOV denotes an angle of view of the lens optical system.

$$1 < TTL/\text{ImgH} < 2$$  Condition (2):

Here, TTL denotes a distance from an incidence surface of the first lens to the image sensor and ImgH denotes a diagonal length of a maximum pixel region of the image sensor.

$$0 \leq TL4L5 \leq 0.03$$  Condition (3):

Here, TL4L5 (unit: mm) denotes a distance between the fourth lens and the fifth lens.

$$0.15 < (TL1 + TL2 + TL1L2)/OAL < 0.4$$  Condition (4):

Here, TL1 denotes a center thickness of the first lens, TL2 denotes a center thickness of the second lens, TL1L2 denotes a distance between the first lens and the second lens, and OAL denotes a distance from a center of the incidence surface of the first lens to a center of an exit surface of the fifth lens.

The Condition (4) may be $0.15 < (TL1+TL2+TL1L2)/OAL < 0.25$.

$$0.7 < Nd1/Nd5 < 0.95$$  Condition (5):

Herein, Nd1 denotes a refractive index of the first lens and Nd5 denotes a refractive index of the fifth lens.

$$2 < Abv1/Abv5 < 4$$  Condition (6):

Herein, Abv1 denotes an Abbe number of the first lens and Abv5 denotes an Abbe number of the fifth lens.

The fourth lens and the fifth lens may be cemented together to form a cemented lens. The cemented lens may have a positive (+) refractive power. At least one of an incidence surface and an exit surface of the cemented lens may be an aspherical surface.

The first lens, the second lens, and the third lens may be aspherical lenses.

The incidence surface of the first lens may have at least one inflection point from a central portion thereof to an edge thereof.

A central portion of the incidence surface of the first lens may be concave with respect to the object and may be convex toward an edge thereof.

An exit surface of the second lens may be convex toward the object.

The first to fifth lenses may be glass lenses.

An aperture diaphragm may be further provided between the object and the image sensor.

The aperture diaphragm may be arranged between the second lens and the third lens.

An infrared blocking unit may be further provided between the object and the image sensor.

The infrared blocking unit may be arranged between the fifth lens and the image sensor.

According to another aspect of the present disclosure, a lens optical system includes: a first lens, a second lens, a third lens, a fourth lens, and a fifth lens sequentially arranged from an object to an image sensor where an image of the object is formed, wherein the first lens, the second lens, the third lens, the fourth lens, and the fifth lens have a negative (−) refractive power, a positive (+) refractive power, a positive (+) refractive power, a positive (+) refractive power, and a negative (−) refractive power, respectively, and the first lens is an aspherical lens having an exit surface that is concave with respect to the image sensor, the second lens is an aspherical lens having an incidence surface that is convex toward the object, the third lens is an aspherical lens having an exit surface that is toward the image sensor, the fourth lens and the fifth lens are cemented together to form a cemented lens, the cemented lens has a positive (+) refractive power, and at least one of an incidence surface and an exit surface of the cemented lens is an aspherical surface.

An angle of view of the lens optical system may be greater than about 100°, and a distance from an incidence surface of the first lens to the image sensor may be smaller than about 8 mm.

The lens optical system may satisfy at least one of the following Conditions (1) to (6).

| | |
|---|---|
| $100°<FOV<200°$ | Condition (1): |
| $1<TTL/\text{ImgH}<2$ | Condition (2): |
| $0 \le TL4L5 \le 0.03$ | Condition (3): |
| $0.15<(TL1+TL2+TL1L2)/OAL<0.4$ | Condition (4): |
| $0.7<Nd1/Nd5<0.95$ | Condition (5): |
| $2<Abv1/Abv5<4$ | Condition (6): |

Here, FOV denotes an angle of view of the lens optical system, TTL denotes a distance from the incidence surface of the first lens to the image sensor, ImgH denotes a diagonal length of a maximum pixel region of the image sensor, TL4L5 (unit: mm) denotes a distance between the fourth lens and the fifth lens, TL1 denotes a center thickness of the first lens, TL2 denotes a center thickness of the second lens, TL1L2 denotes a distance between the first lens and the second lens, OAL denotes a distance from a center of the incidence surface of the first lens to a center of an exit surface of the fifth lens, Nd1 denotes a refractive index of the first lens, Nd5 denotes a refractive index of the fifth lens, Abv1 denotes an Abbe number of the first lens, and Abv5 denotes an Abbe number of the fifth lens.

The first to fifth lenses may be glass lenses.

An aperture diaphragm may be further provided between the second lens and the third lens.

An infrared blocking unit may be further provided between the fifth lens and the image sensor.

It may be possible to implement a compact lens optical system having a short total length while having an angle of view with a wide angle (or a super-wide angle), unlike the related-art car lenses or action cam lenses. Also, it may be possible to implement a lens optical system that may easily ensure high performance/high resolution while having high reliability.

More particularly, a lens optical system according to an embodiment of the present disclosure may include first to fifth lenses that are sequentially arranged from an object to an image sensor and have a negative (−) refractive power, a positive (+) refractive power, a positive (+) refractive power, a positive (+) refractive power, and a negative (−) refractive power respectively, and may satisfy at least one of the above Conditions (1) to (6). Since the lens optical system may easily (well) correct various aberrations while having a wide angle of view and a short total length, it may be advantageous for high performance and miniaturization/lightening of a camera. Particularly, by applying an aspherical glass lens to at least one of the first to fifth lenses, high reliability may be ensured and simultaneously excellent performance may be easily ensured.

DETAILED DESCRIPTION

Hereinafter, lens optical systems according to embodiments of the present disclosure will be described in detail with reference to the accompanying drawings. Like reference numerals will denote like elements throughout the specification.

Figure 1:
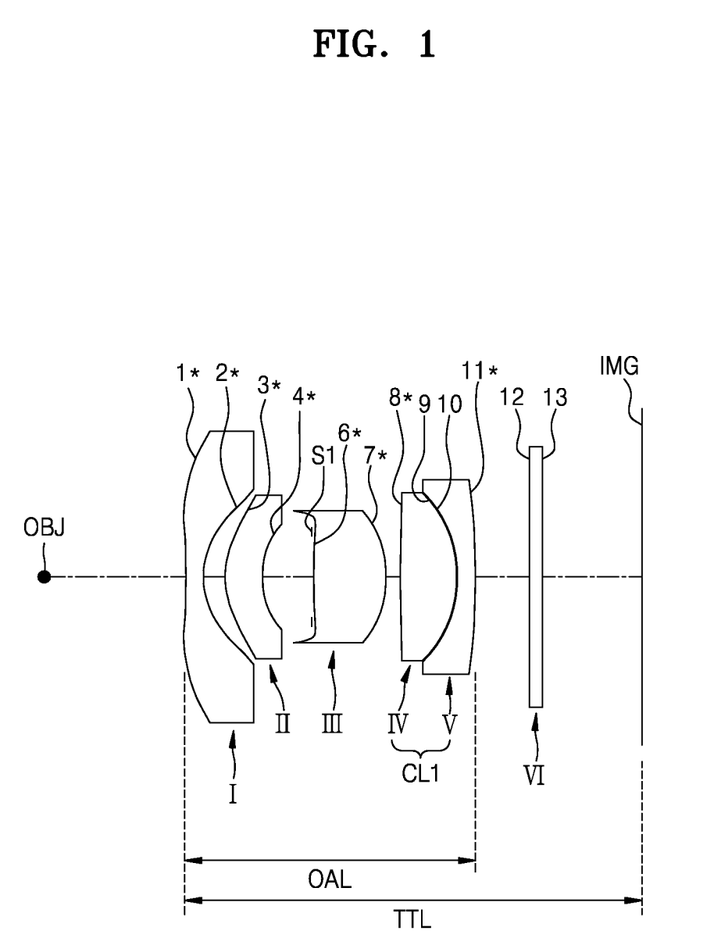
FIGS. 1 to 3 are cross-sectional views illustrating the arrangement of main components of lens optical systems according to first to third embodiments of the present disclosure, respectively.
Figure 2:
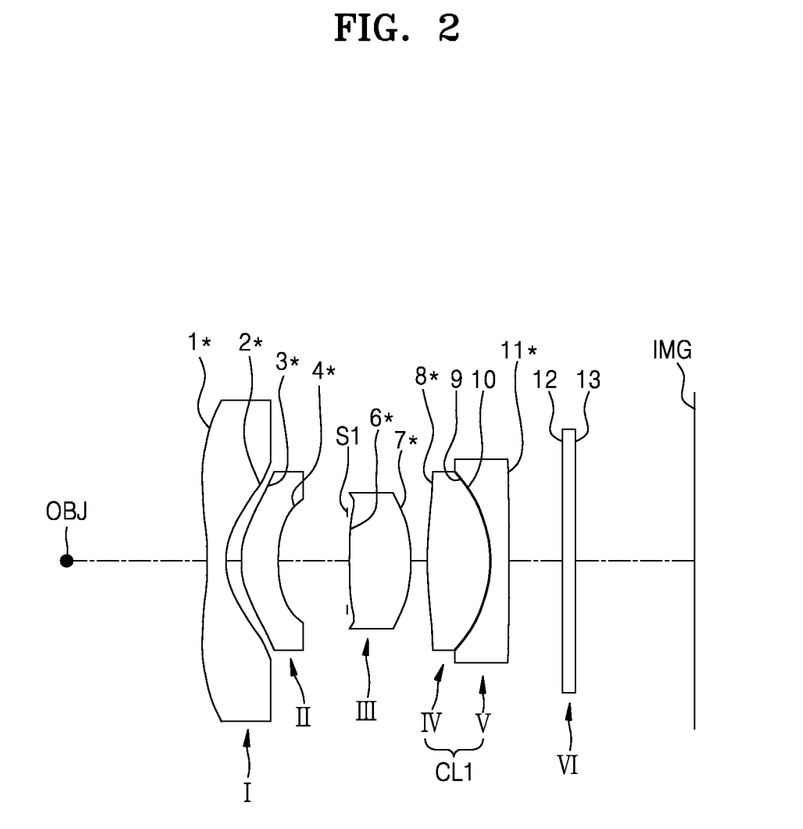
Figure 3:
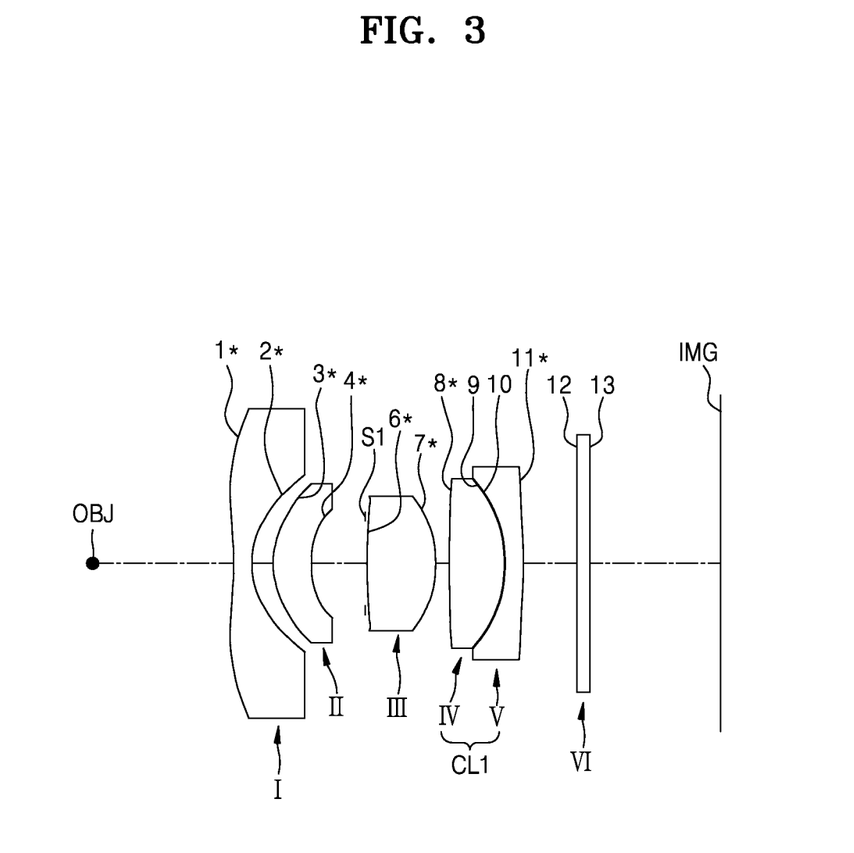

FIGS. 1 to 3 illustrate lens optical systems according to first to third embodiments of the present disclosure, respectively.

Referring to FIGS. 1 to 3, a lens optical system according to embodiments of the present disclosure may include a first lens I, a second lens II, a third lens III, a fourth lens IV, and a fifth lens V sequentially arranged from an object OBJ to an image sensor IMG where an image of the object OBJ is formed. The first lens I may have a negative (−) refractive power. An incidence surface 1* of the first lens I may have at least one inflection point from a central portion thereof to an edge thereof. A central portion of the incidence surface 1* of the first lens I may be concave with respect to the object OBJ and may be convex toward an edge thereof. An exit surface 2* of the first lens I may be concave with respect to the image sensor IMG. The second lens II may have a positive (+) refractive power and may have a convex shape toward the object OBJ. An incidence surface 3* of the second lens II may be convex toward the object OBJ and an exit surface 4* of the second lens II may also be convex toward the object OBJ. Thus, the second lens II may be a convex meniscus lens toward the object OBJ.

The third lens III may have a positive (+) refractive power and may have an exit surface 7* convex toward the image sensor IMG. An incidence surface 6* of the third lens III may be convex toward the object OBJ. Thus, the third lens III may be a lens whose both surfaces (i.e., the incidence surface 6* and the exit surface 7*) are convex, that is, a biconvex lens. In this case, the absolute value of the curvature radius of the incidence surface 6* may be greater than the absolute value of the curvature radius of the exit surface 7*.

At least one of the first to third lenses I to III may be an aspherical lens. In other words, the incidence surfaces 1*, 3*, and/or 6* and the exit surfaces 2*, 4*, and/or 7* of at least one of the first to third lenses I to III may be aspherical surfaces. For example, the incidence surfaces 1*, 3*, and 6* and the exit surfaces 2*, 4*, and 7* of the first to third lenses I to III may all be aspherical surfaces.

The fourth lens IV may have a positive (+) refractive power and may have an exit surface 9 convex toward the image sensor IMG. An incidence surface 8* of the fourth lens IV may be convex toward the object OBJ. The fifth lens V may have a negative (−) refractive power and may have a convex shape toward the image sensor IMG. An incidence surface 10 of an exit surface 11* of the fifth lens V may be convex toward the image sensor IMG. The absolute value of the curvature radius of the exit surface 11* of the fifth lens V may be greater than the absolute value of the curvature radius of the incidence surface 10.

The fourth lens IV and the fifth lens V may be cemented together to form a cemented lens CL1. In this case, the distance between the fourth lens IV and the fifth lens V may be zero or near zero. The exit surface 9 of the fourth lens IV and the incidence surface 10 of the fifth lens V may be substantially the same surface (junction surface) or surfaces that are very close to each other. The cemented lens CL1 formed by the fourth lens IV and the fifth lens V may have a positive (+) refractive power. At least one of the incidence surface 8* of the cemented lens CL1 (i.e., the incidence surface 8* of the fourth lens IV) and the exit surface 11* of the cemented lens CL1 (i.e., the exit surface 11* of the fifth lens V) may be an aspherical surface. For example, both the incidence surface 8* and the exit surface 11* of the cemented lens CL1 may be aspherical surfaces. Meanwhile, the junction surface (i.e., 9/10) between the fourth lens IV and the fifth lens V may be a spherical surface. In other words, the exit surface 9 of the fourth lens IV and the incidence surface 10 of the fifth lens V may be spherical surfaces.

At least one of the first to fifth lenses I to V may be a glass lens. For example, all of the first to fifth lenses I to V may be glass lenses. Since each of the first to fifth lenses I to V may have at least one aspherical surface, the first to fifth lenses I to V may be 'aspherical glass lenses'. In this case, the first to fifth lenses I to V may be manufactured by using a moldable glass material. As such, when the aspherical glass lenses are used, high-reliability characteristics of the glass lenses may be ensured and simultaneously advantages of the aspherical surfaces (e.g., performance improvement, total length reduction, and miniaturization) may be implemented.

Among the first to fifth lenses I to V, the outer diameter of the first lens I may be the greatest and the outer diameter of the third lens III may be the smallest. The outer diameter may increase gradually from the third lens III to the fourth lens IV and the fifth lens V. The outer diameter of the second lens II may be considerably smaller than the outer diameter of the first lens I and may be somewhat greater than the outer diameter of the third lens III.

An aperture diaphragm S1 and an infrared blocking unit VI may be further provided between the object OBJ and the image sensor IMG. The aperture diaphragm S1 may be provided between the second lens II and the third lens III. The infrared blocking unit VI may be provided between the fifth lens V and the image sensor IMG. The infrared block-ing unit VI may be an infrared blocking filter. In some cases, the positions of the aperture diaphragm S1 and the infrared blocking unit VI may vary.

The lens optical system having the above configuration according to embodiments of the present disclosure may satisfy at least one of the following Conditions (1) to (6).

$$100°<FOV<200°$$ Condition (1):

Herein, FOV denotes an angle of view of the lens optical system. The angle of view may be a diagonal field of view of the lens optical system $$1<TTL/\text{ImgH}<2$$ Condition (2):

Herein, TTL denotes a distance from the incidence surface 1* of the first lens I to the image sensor IMG, that is, a total length of the lens optical system, and ImgH denotes a diagonal length of a maximum pixel region of the image sensor IMG. TTL may be a distance measured along an optical axis. In other words, TTL may be a linear distance from the center of the incidence surface 1* of the first lens I to the center of the image sensor IMG. Meanwhile, ImgH may be the maximum diagonal length of the image sensor IMG.

When Conditions (1) and (2) are satisfied, it may mean that the lens optical system according to the present embodiment has a wide angle of view (wide angle/super-wide angle) and simultaneously has a short total length TTL. For example, the FOV of the lens optical system may be about 100° or more or about 120° or more, and the TTL may be about 10 mm or less or about 8 mm or less. Also, since TTL is not so great in comparison with ImgH, Condition (2) may be satisfied. As such, according to the present embodiment, a compact lens optical system having a short total length while having an angle of view with a wide angle (super-wide angle) may be implemented.

When TTL/ImgH approaches the lower limit value "1" in Condition (2), it may be more advantageous to make the lens optical system compact. However, when TTL/ImgH is smaller than the lower limit value "1", various aberrations such as a spherical aberration may increase. Meanwhile, when TTL/ImgH approaches the upper limit value "2", it may be advantageous for aberration correction. However, when TTL/ImgH is greater than the upper limit value "2", the total length of the lens optical system may increase and thus it may be difficult to make the lens optical system compact. Therefore, adjusting TTL/ImgH to the above range may be advantageous to make the lens optical system compact and ensure the performance thereof.

$$0 \leq TL4L5 \leq 0.03$$ Condition (3):

Herein, TL4L5 (unit: mm) denotes a distance between the fourth lens IV and the fifth lens V. TL4L5 may be a distance measured along the optical axis. That is, TL4L5 may be a linear distance between the center of the exit surface 9 of the fourth lens IV and the incidence surface 10 of the fifth lens V.

Condition (3) may mean that the fourth lens IV and the fifth lens V constitute a cemented lens CL1 or are close to each other similar to a cemented lens. In order to minimize the aberration of the lens optical system and reduce the total length TTL, the fourth lens IV and the fifth lens V may be cemented to each other or located very close to each other. Meanwhile, by applying an aspherical surface to the incidence surface 8* and the exit surface 11* of the cemented lens CL1, it may be advantageous to ensure excellent performance even in a short total length TTL.

$$0.15<(TL1+TL2+TL1L2)/OAL<0.4$$ Condition (4):

Herein, TL1 denotes a center thickness of the first lens I, TL2 denotes a center thickness of the second lens II, TL1L2 denotes a distance between the first lens I and the second lens II, and OAL denotes a distance from the center of the incidence surface 1* of the first lens I to the center of the exit surface 11* of the fifth lens V. The TL1, TL2, TL1L2, and OAL may be distances measured along the optical axis.

Condition (4) may define the ratio of the total length (i.e., TL1+TL2+TL1L2) between the first lens I and the second lens II to the length OAL of the lens system, and Condition (4) may be satisfied to ensure excellent performance while having a short total length TTL and an angle of view with a wide angle (or a super-wide angle). In other words, when Condition 4 is satisfied, it may be advantageous to ensure the excellent performance while ensuring the wide-angle and short-total-length characteristics of Conditions (1) and (2).

Condition (4) may satisfy 0.15<(TL1+TL2+TL1L2)/OAL<0.25. The condition 0.15<(TL1+TL2+TL1L2)/OAL<0.25 may be related to a structure in which a convex portion (convex portion of the incidence surface) of the second lens II is inserted into a concave portion (concave portion of the exit surface) of the first lens I. That is, with respect to the fact that a portion of the second lens II is inserted into the concave portion of the first lens I, (TL1+TL2+TL1L2)/OAL may have a value of 0.25 or less. Thus, it may be advantageous to ensure excellent performance while having a short total length TTL and an angle of view with a wide angle (or a super-wide angle).

$$0.7 < Nd1/Nd5 < 0.95 \quad \text{Condition (5):}$$

Herein, Nd1 denotes a refractive index of the first lens I, and Nd5 denotes a refractive index of the fifth lens V. Nd1 and Nd5 may be measured by using a d-line Condition (5) may represent conditions for the materials of the first lens I and the fifth lens V. A low-refractive lens may be used as the first lens I and a high-refractive lens may be used as the fifth lens V. Herein, the terms 'low refractive' and 'high refractive' may be relative terms. That is, the refractive index of the first lens I may be relatively smaller than the refractive index of the fifth lens V. When this condition is satisfied, it may be advantageous to widen the angle of view of the lens optical system. Also, when Condition (5) is satisfied, problems such as coma aberration and astigmatism may be suitably controlled by controlling the refractive indexes of the first and fifth lenses I and V.

$$2 < Abv1/Abv5 < 4 \quad \text{Condition (6):}$$

Herein, Abv1 denotes an Abbe number of the first lens I, and Abv5 denotes an Abbe number of the fifth lens V. Abv1 and Abv5 may be measured by using a d-line Condition (6) may define the Abbe number condition of the first lens I and the fifth lens V, wherein a material having a relatively-high Abbe number may be applied to the first lens I and a material having a relatively-low Abbe number may be applied to the fifth lens V. Condition (6) may be a condition for reducing the chromatic aberration of the lens optical system. When Condition (6) is satisfied, a chromatic aberration that may occur in a wide-angle (or super-wide angle) lens system may be minimized, and excellent performance may be easily ensured.

In the first to third embodiments of the present disclosure, the values of Conditions (1) to (6) are as illustrated in Table 1 below. In Table 1, the unit of FOV (angle of view) is ° and the unit of TL4L5 is mm. Meanwhile, Table 2 summarizes the values of variables required to obtain Table 1. In Table 2, the units of TTL, ImgH, TL1, TL2, TL1L2, TL4L5, and OAL are mm.

TABLE 1

| Classification | Formula | Embodiment 1 | Embodiment 2 | Embodiment 3 |
|---|---|---|---|---|
| Condition (1) | FOV | 128.70 | 127.35 | 128.22 |
| Condition (2) | TTL/ImgH | 1.27 | 1.27 | 1.27 |
| Condition (3) | TL4L5 | 0.01 | 0.01 | 0.01 |
| Condition (4) | (TL1 + TL2 + TL1L2)/OAL | 0.20 | 0.19 | 0.20 |
| Condition (5) | Nd1/Nd5 | 0.81 | 0.81 | 0.81 |
| Condition (6) | Abv1/Abv5 | 2.96 | 2.96 | 2.96 |

TABLE 2

|  | Embodiment 1 | Embodiment 2 | Embodiment 3 |
|---|---|---|---|
| TTL | 7.86 | 7.90 | 7.90 |
| ImgH | 6.20 | 6.20 | 6.20 |
| TL1 | 0.300 | 0.300 | 0.300 |
| TL2 | 0.620 | 0.607 | 0.620 |
| TL1L2 | 0.350 | 0.244 | 0.348 |
| TL4L5 | 0.010 | 0.010 | 0.010 |
| OAL | 4.71 | 4.89 | 4.70 |
| Nd1 | 1.487 | 1.487 | 1.487 |
| Nd5 | 1.847 | 1.847 | 1.847 |
| Abv1 | 70.474 | 70.474 | 70.474 |
| Abv5 | 23.792 | 23.792 | 23.792 |

Referring to Table 1 and Table 2, it may be seen that the lens optical systems of the first to third embodiments satisfy Conditions (1) to (6).

Meanwhile, at least one of the first to fifth lenses I to V in the lens optical systems having the above configuration according to embodiments of the present disclosure may be manufactured by using a moldable glass material. For example, all of the first to fifth lenses I to V may be manufactured by using a moldable glass material. In this case, all of the first to fifth lenses I to V may be glass lenses. When the glass lenses are used, high reliability may be ensured in comparison with the case of using plastic. Also, since the aspherical surfaces may be applied to the glass lenses in an embodiment of the present disclosure, it may be possible to obtain various effects of the aspherical surfaces, such as total length reduction, compactness, aberration correction, and high performance. However, the materials of the first to fifth lenses I to V are not limited to glass. When necessary, at least one of the first to fifth lenses I to V may be manufactured by using plastic.

Hereinafter, the first to third embodiments of the present disclosure will be described in detail with reference to the lens data and the accompanying drawings.

Tables 3 to 5 below illustrate the curvature radius, the lens thickness or the distance between lenses, the refractive index, and the Abbe number of each lens constituting the lens optical systems of FIGS. 1 to 3, respectively. In Tables 3 to 5, R denotes a curvature radius, D denotes a lens thickness or a lens interval or an interval between adjacent components, Nd denotes a refractive index of a lens measured by using a d-line, and Vd denotes an Abbe number of the lens with respect to the d-line. In the number of a lens surface, "*" may indicate that the lens surface is an aspherical surface. Also, the unit of "R" value and "D" value is mm.

TABLE 3

| Embodiment 1 | Surface | R | D | Nd | Vd |
|---|---|---|---|---|---|
| I | 1* | −5.82309 | 0.30000 | 1.48749 | 70.47382 |
|  | 2* | 1.20330 | 0.34968 |  |  |

TABLE 3-continued

| Embodiment 1 | Surface | R | D | Nd | Vd |
|---|---|---|---|---|---|
| II | 3* | 1.30106 | 0.62000 | 1.74330 | 49.34250 |
|  | 4* | 1.62627 | 0.78680 |  |  |
|  | S1 | Infinity | 0.03000 |  |  |
| III | 6* | 10.31793 | 1.15800 | 1.58313 | 59.40501 |
|  | 7* | −2.08783 | 0.23907 |  |  |
| IV | 8* | 6.26587 | 0.91610 | 1.74330 | 49.34250 |
|  | 9 | −1.95975 | 0.01000 |  |  |
| V | 10 | −1.95975 | 0.30000 | 1.84667 | 23.79229 |
|  | 11* | −9.88595 | 0.87056 |  |  |
| VI | 12 | Infinity | 0.21000 | 1.51680 | 64.19733 |
|  | 13 | Infinity | 2.11478 |  |  |
|  | IMG | Infinity | −0.00500 |  |  |

TABLE 4

| Embodiment 2 | Surface | R | D | Nd | Vd |
|---|---|---|---|---|---|
| I | 1* | −3.60832 | 0.30000 | 1.48749 | 70.47382 |
|  | 2* | 1.12050 | 0.24362 |  |  |
| II | 3* | 1.31500 | 0.60731 | 1.74330 | 49.34250 |
|  | 4* | 2.24520 | 1.12404 |  |  |
|  | S1 | Infinity | 0.03000 |  |  |
| III | 6* | 6.04384 | 0.99653 | 1.58313 | 59.40501 |
|  | 7* | −2.68731 | 0.26903 |  |  |
| IV | 8* | 4.56075 | 1.01146 | 1.74330 | 49.34250 |
|  | 9 | −2.10075 | 0.01000 |  |  |
| V | 10 | −2.10075 | 0.30000 | 1.84667 | 23.79229 |
|  | 11* | −26.98311 | 0.87056 |  |  |
| VI | 12 | Infinity | 0.21000 | 1.51680 | 64.19733 |
|  | 13 | Infinity | 1.92734 |  |  |
|  | IMG | Infinity | 0.00000 |  |  |

TABLE 5

| Embodiment 3 | Surface | R | D | Nd | Vd |
|---|---|---|---|---|---|
| I | 1* | −4.85974 | 0.30000 | 1.48749 | 70.47382 |
|  | 2* | 1.20949 | 0.34844 |  |  |
| II | 3* | 1.28000 | 0.62000 | 1.74330 | 49.34250 |
|  | 4* | 1.66645 | 0.87161 |  |  |
|  | S1 | Infinity | 0.03000 |  |  |
| III | 6* | 9.91682 | 1.11111 | 1.58313 | 59.40501 |
|  | 7* | −1.93234 | 0.22005 |  |  |
| IV | 8* | 8.38306 | 0.88972 | 1.74330 | 49.34250 |
|  | 9 | −2.04106 | 0.01000 |  |  |
| V | 10 | −2.04106 | 0.30000 | 1.84667 | 23.79229 |
|  | 11* | −10.84774 | 0.87056 |  |  |

TABLE 5-continued

| Embodiment 3 | Surface | R | D | Nd | Vd |
|---|---|---|---|---|---|
| VI | 12 | Infinity | 0.21000 | 1.51680 | 64.19733 |
|  | 13 | Infinity | 2.12351 |  |  |
|  | IMG | Infinity | −0.00500 |  |  |

Meanwhile, the F-number (Fno), focal length (f), and angle of view (FOV) of the lens optical systems according to the first to third embodiments of the present disclosure corresponding respectively to FIGS. 1 to 3 may be summarized as in Table 6 below.

TABLE 6

| Classification | F-number (Fno) | Focal Length (f) [mm] | Field of View (FOV) [°] |
|---|---|---|---|
| Embodiment 1 | 2.68 | 2.41 | 128.70 |
| Embodiment 2 | 2.68 | 2.42 | 127.35 |
| Embodiment 3 | 2.68 | 2.43 | 128.22 |

Also, in the lens optical systems according to the first to third embodiments of the present disclosure, the aspherical surface of each lens may satisfy the following aspherical equation.

$$x = \frac{c'y^2}{1 + \sqrt{1 - (K+1)c'^2 y^2}} + Ay^4 + By^6 + Cy^8 + Dy^{10} + Ey^{12}$$

< Aspherical Equation >

Herein, "x" denotes a distance from the vertex of the lens in the optical axis direction, "y" denotes a distance in a direction perpendicular to the optical axis, "c" denotes a reciprocal (=1/r) of the curvature radius at the vertex of the lens, "K" denotes a conic constant, and "A, B, C, D and E" denote aspherical coefficients.

Tables 7 to 9 below illustrate aspherical coefficients of the aspherical surfaces in the lens system according to the first to third embodiments corresponding to FIGS. 1 to 3, respectively. That is, Tables 7 to 9 illustrate the aspherical coefficients of the incidence surfaces 1*, 3*, 6*, and 8* and the exit surfaces 2*, 4*, 7*, and 11* of the lenses of Tables 3 to 5, respectively.

TABLE 7

| Surface | K | A | B | C | D | E |
|---|---|---|---|---|---|---|
| 1* | 0.00000 | 0.08656 | −0.03551 | 0.01345 | −0.00371 | 0.00066 |
| 2* | −0.83799 | −0.06619 | 0.13986 | −0.19192 | 0.18499 | −0.07305 |
| 3* | −1.08271 | −0.07570 | 0.10868 | −0.36452 | 0.68084 | −0.70969 |
| 4* | 2.18355 | −0.00586 | −0.36343 | 2.00564 | −8.36814 | 22.20271 |
| 6* | 35.00000 | 0.00804 | −0.21192 | 0.98693 | −2.37892 | 2.98961 |
| 7* | 1.30201 | −0.11753 | 0.12316 | −0.05161 | −0.04334 | 0.08201 |
| 8* | 0.00000 | −0.09699 | 0.09840 | −0.11384 | 0.13727 | −0.12923 |
| 11* | 0.00000 | 0.00884 | −0.02496 | 0.04447 | −0.04643 | 0.02985 |

TABLE 8

| Surface | K | A | B | C | D | E |
|---|---|---|---|---|---|---|
| 1* | −0.11708 | 0.08837 | −0.02992 | 0.00837 | −0.00168 | 0.00024 |
| 2* | −1.17079 | −0.04438 | −0.11761 | 0.38564 | −0.46772 | 0.28259 |
| 3* | −1.14533 | −0.01340 | −0.19046 | 0.45860 | −0.59084 | 0.42684 |
| 4* | 3.67867 | 0.06880 | −0.21265 | 0.62362 | −1.13236 | 1.14189 |
| 6* | 35.39198 | −0.01042 | −0.02454 | 0.10675 | −0.34709 | 0.89119 |

TABLE 8-continued

| Surface | K | A | B | C | D | E |
|---|---|---|---|---|---|---|
| 7* | 0.79818 | −0.09506 | 0.09975 | −0.14392 | 0.26822 | −0.34570 |
| 8* | −0.01384 | −0.07333 | 0.05659 | −0.05844 | 0.05904 | −0.04385 |
| 11* | 0.00000 | 0.01129 | −0.01160 | 0.01556 | −0.01604 | 0.01102 |

TABLE 9

| Surface | K | A | B | C | D | E |
|---|---|---|---|---|---|---|
| 1* | 0.00000 | 0.07099 | −0.02227 | 0.00607 | −0.00125 | 0.00018 |
| 2* | −0.76836 | −0.08275 | 0.14585 | −0.33233 | 0.59110 | −0.61198 |
| 3* | −0.75070 | −0.03389 | −0.03282 | 0.03121 | 0.05957 | −0.13421 |
| 4* | 2.33366 | 0.05833 | −0.38264 | 2.03124 | −8.34770 | 22.20271 |
| 6* | 39.47163 | 0.00055 | −0.09979 | 0.34876 | −0.62403 | 0.68690 |
| 7* | 0.76203 | −0.08561 | 0.07585 | 0.02474 | −0.16225 | 0.25814 |
| 8* | 0.00000 | −0.07246 | 0.07396 | −0.06163 | 0.04790 | −0.03411 |
| 11* | 0.00000 | 0.01202 | −0.01875 | 0.03435 | −0.03636 | 0.02393 |

Figure 4:
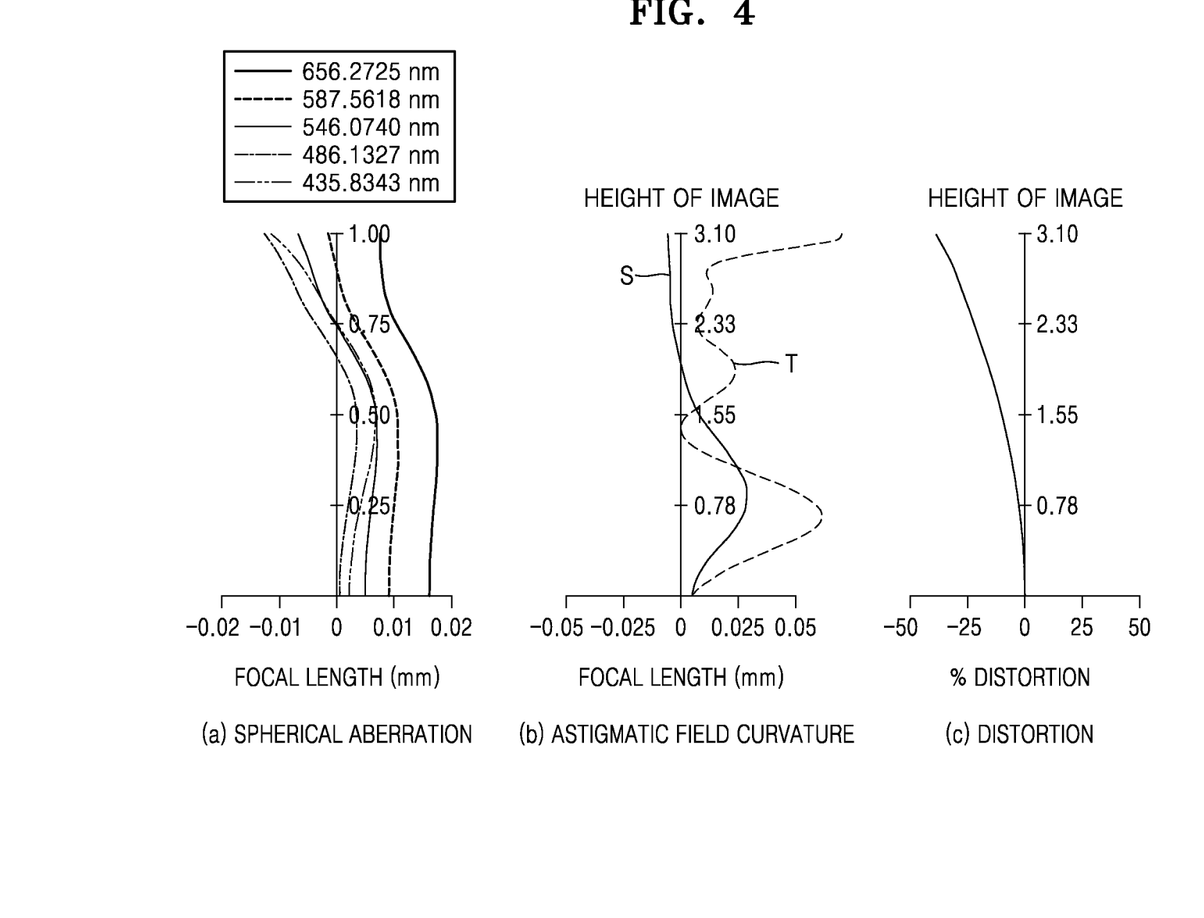
FIG. 4 is an aberration diagram illustrating longitudinal spherical aberration, astigmatic field curvature, and distortion of the lens optical system according to the first embodiment of the present disclosure.

FIG. 4 is an aberration diagram illustrating a longitudinal spherical aberration, an astigmatic field curvature, and a distortion of the lens optical system according to the first embodiment (FIG. 1) of the present disclosure, that is, the lens optical system having the numerical values of Table 3.

Figure 5:
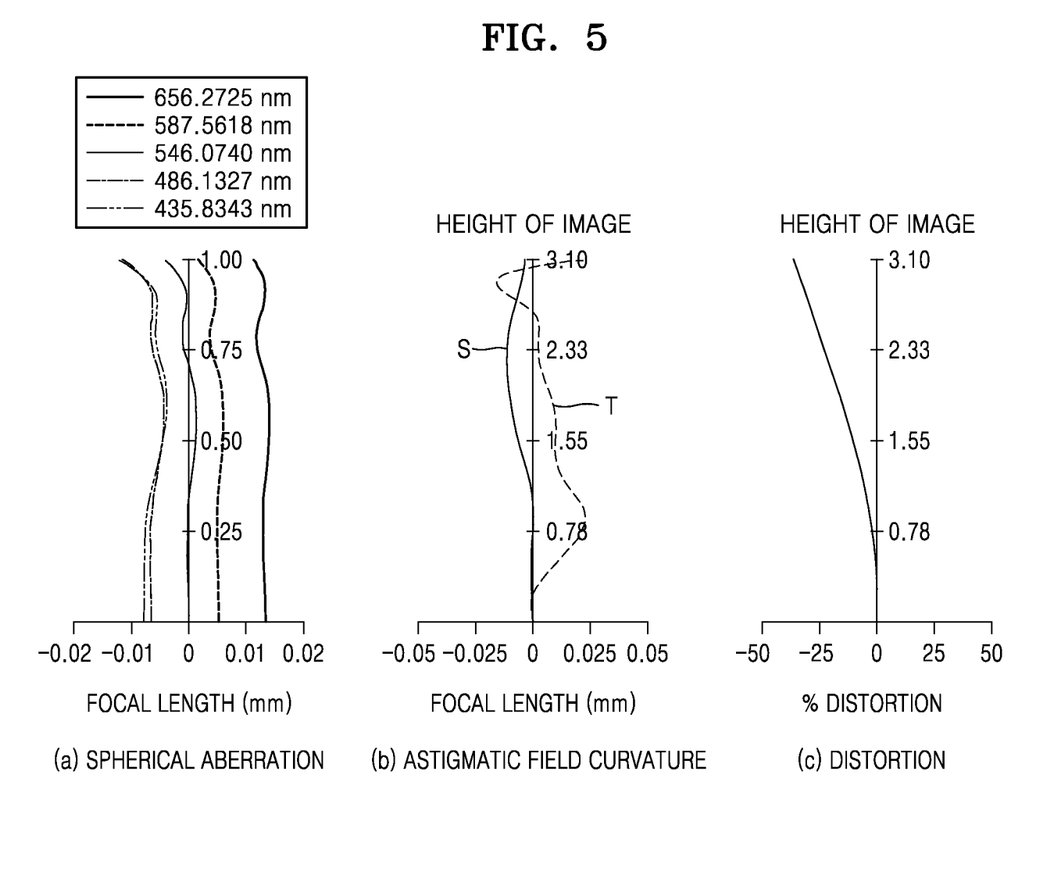
FIG. 5 is an aberration diagram illustrating longitudinal spherical aberration, astigmatic field curvature, and distortion of the lens optical system according to the second embodiment of the present disclosure.
Figure 6:
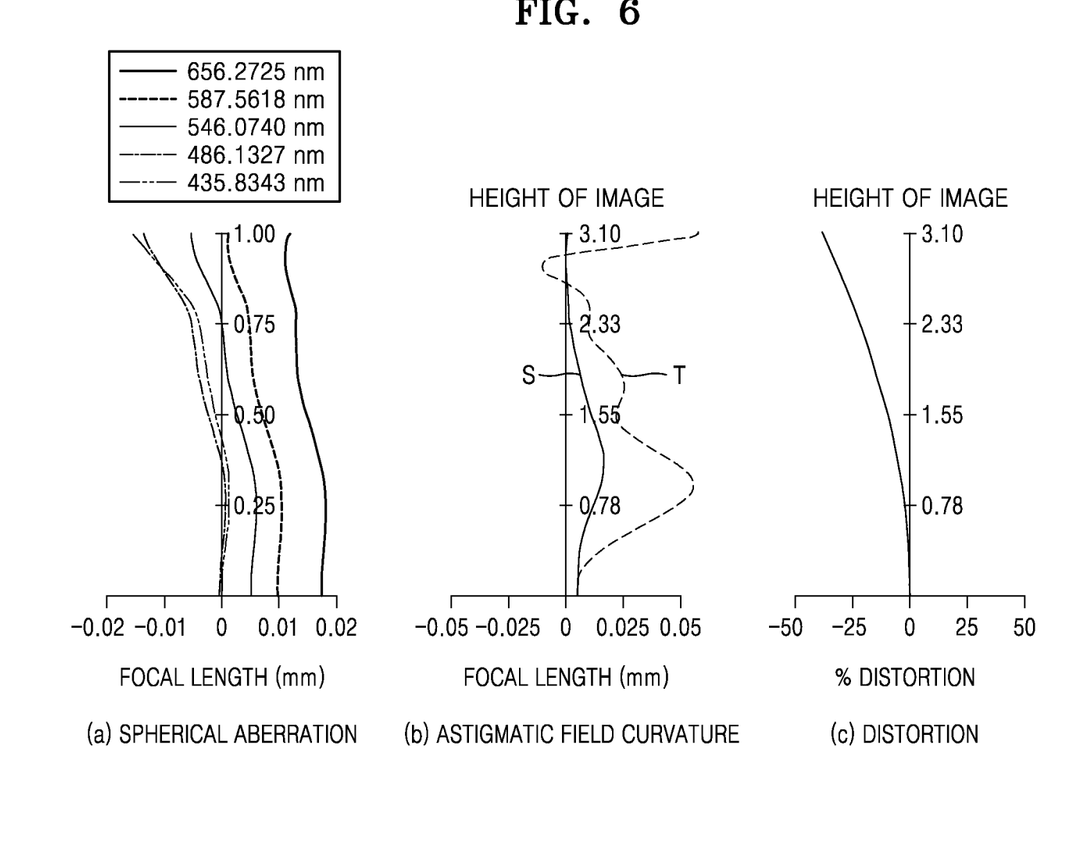
FIG. 6 is an aberration diagram illustrating longitudinal spherical aberration, astigmatic field curvature, and distortion of the lens optical system according to the third embodiment of the present disclosure.

FIG. 4(a) illustrates a spherical aberration of the lens optical system with respect to various wavelengths of light, and FIG. 4(b) illustrates an astigmatic field curvature (i.e., a tangential field curvature T and a sagittal field curvature S) of the lens optical system. Light wavelengths 656.2725 nm, 587.5618 nm, 546.0740 nm, 486.1327 nm, and 435.8343 nm are used to obtain (a) data. A light wavelength 546.0740 nm is used to obtain (b) and (c) data. This is also true in FIGS. 5 and 6.

FIG. 5(a), FIG. 5(b), and FIG. 5(c) are respectively aberration diagrams illustrating a longitudinal spherical aberration, an astigmatic field curvature, and a distortion of the lens optical system according to the second embodiment (FIG. 2) of the present disclosure, that is, the lens optical system having the numerical values of Table 4.

FIG. 6(a), FIG. 6(b), and FIG. 6(c) are respectively aberration diagrams illustrating a longitudinal spherical aberration, an astigmatic field curvature, and a distortion of the lens optical system according to the third embodiment (FIG. 3) of the present disclosure, that is, the lens optical system having the numerical values of Table 5.

As described above, a lens optical system according to embodiments of the present disclosure may include first to fifth lenses I to V that are sequentially arranged from an object OBJ to an image sensor IMG and have a negative (−) refractive power, a positive (+) refractive power, a positive (+) refractive power, a positive (+) refractive power, and a negative (−) refractive power respectively and may satisfy at least one of the above Conditions (1) to (6). The lens optical system may have a wide angle of view (wide angle/super-wide angle) and a short total length and may easily (well) correct various aberrations. Thus, according to an embodiment of the present disclosure, it may be possible to implement a lens optical system that has a miniature (subminiature) size and a wide angle of view (wide angle/super-wide angle) and may obtain high performance and high resolution. Also, by manufacturing the first to fifth lenses I to V by glass and applying the aspherical surface to at least one of both surfaces (the incidence surface and the exit surface) of each of the lenses I to V, the reliability and performance of the lens optical system may be improved.

The lens optical system according to the embodiments described above may be applied to a lens system of a vehicle camera. For example, the lens optical system according to an embodiment of the present disclosure may be applied to various vehicle apparatuses such as a black box, an around view monitoring (AVM) system, or a rear camera. Also, the lens optical system may be applied to various action cams such as drones or leisure sports camcorders. In addition, the lens optical system may be applied to various monitoring cameras. Since a vehicle camera or an action cam may be highly exposed to the external environment, it may require a high-reliability optical system. Also, a compact optical system having a short total length may be required due to the miniaturization (compactness) and lightweight of apparatuses. The lens optical system according to an embodiment of the present disclosure may satisfy various requirements such as high reliability, a wide angle of view, a short total length, and excellent performance and may be advantageously applied to various fields such as vehicle cameras, action cams, and monitoring cameras. However, the lens optical system according to an embodiment of the present disclosure may also be applied to various other fields other than the above fields.

Although many details have been described above, they are not intended to limit the scope of the present disclosure, but should be interpreted as examples of the embodiments. For example, those of ordinary skill in the art will understand that the above effects may be obtained when at least one of the above Conditions (1) to (6) is satisfied, even when the shapes of the lenses are somewhat modified in the lens optical system according to an embodiment of the present disclosure. Also, it may be understood that the above effects may be obtained when the power arrangement of lenses, the shape condition thereof, and other conditions are satisfied even when at least some of the Conditions (1) to (6) are not satisfied. In addition, it will be understood that a blocking film may be used instead of the filter as the infrared blocking unit VI. It will also be understood that various other modifications are possible. Therefore, the scope of the present disclosure should be defined not by the described embodiments but by the technical spirit and scope described in the following claims.

What is claimed is:

1. A lens optical system comprising:
a first lens, a second lens, a third lens, a fourth lens, and a fifth lens sequentially arranged in the stated order from an object to an image sensor where an image of the object is formed,
wherein the first lens has a negative (−) refractive power and has an exit surface that is concave with respect to the image sensor, and
the lens optical system satisfies all of the following conditions:

$$100° < FOV < 200° \quad \text{Condition (1)}$$

$$1 < TTL/\text{ImgH} < 2 \quad \text{Condition (2)}$$

$$0 \leq TL4L5 \leq 0.03 \quad \text{Condition (3)}$$

where FOV denotes an angle of view of the lens optical system, TTL denotes a distance from an incidence surface of the first lens to the image sensor, and ImgH denotes a diagonal length of a maximum pixel region of the image sensor and where TL4L5 (unit: mm) denotes a distance between the fourth lens and the fifth lens.

2. The lens optical system of claim 1, wherein the lens optical system satisfies the following condition:

$$0.15 < (TL1 + TL2 + TL1L2)/OAL < 0.25 \quad \text{Condition (4)}$$

where TL1 denotes a center thickness of the first lens, TL2 denotes a center thickness of the second lens, TL1L2 denotes a distance between the first lens and the second lens, and OAL denotes a distance from a center of the incidence surface of the first lens to a center of an exit surface of the fifth lens.

3. The lens optical system of claim 1, wherein the lens optical system satisfies the following condition:

$$0.7 < Nd1/Nd5 < 0.95 \quad \text{Condition (5)}$$

where Nd1 denotes a refractive index of the first lens and Nd5 denotes a refractive index of the fifth lens.

4. The lens optical system of claim 1, wherein the lens optical system satisfies the following condition:

$$2 < Abv1/Abv5 < 4 \quad \text{Condition (6)}$$

where Abv1 denotes an Abbe number of the first lens and Abv5 denotes an Abbe number of the fifth lens.

5. The lens optical system of claim 1, wherein the second lens has a positive (+) refractive power, the third lens has a positive (+) refractive power, the fourth lens has a positive (+) refractive power, and the fifth lens has a negative (−) refractive power.

6. The lens optical system of claim 1, wherein the second lens has an incidence surface that is convex toward the object, the third lens has an exit surface that is convex toward the image sensor, the fourth lens has an exit surface that is convex toward the image sensor, and the fifth lens has an incidence surface that is concave with respect to the object.

7. The lens optical system of claim 1, wherein the fourth lens and the fifth lens are cemented together to form a cemented lens, the cemented lens has a positive (+) refractive power, and at least one of an incidence surface and an exit surface of the cemented lens is an aspherical surface.

8. The lens optical system of claim 1, wherein the first lens, the second lens, and the third lens are aspherical lenses.

9. The lens optical system of claim 1, wherein the incidence surface of the first lens has at least one inflection point from a central portion thereof to an edge thereof.

10. The lens optical system of claim 1, wherein a central portion of the incidence surface of the first lens is concave with respect to the object and is convex toward an edge thereof.

11. The lens optical system of claim 1, wherein an exit surface of the second lens is convex toward the object.

12. The lens optical system of claim 1, wherein the first to fifth lenses are glass lenses.

13. The lens optical system of claim 1, further comprising an aperture diaphragm provided between the second lens and the third lens.

14. The lens optical system of claim 1, further comprising an infrared blocking unit provided between the fifth lens and the image sensor.

15. A lens optical system comprising:
a first lens, a second lens, a third lens, a fourth lens, and a fifth lens sequentially arranged from an object to an image sensor where an image of the object is formed,
wherein the first lens, the second lens, the third lens, the fourth lens, and the fifth lens have a negative (−) refractive power, a positive (+) refractive power, a positive (+) refractive power, a positive (+) refractive power, and a negative (−) refractive power, respectively, and
the first lens is an aspherical lens having an exit surface that is concave with respect to the image sensor, the second lens is an aspherical lens having an incidence surface that is convex toward the object, the third lens is an aspherical lens having an exit surface that is convex toward the image sensor, the fourth lens and the fifth lens are cemented together to form a cemented lens,
the cemented lens has a positive (+) refractive power, and at least one of an incidence surface and an exit surface of the cemented lens is an aspherical surface, and
wherein an angle of view of the lens optical system is greater than 100° and a distance from an incidence surface of the first lens to the image sensor is smaller than 8 mm.

16. The lens optical system of claim 15, wherein the lens optical system satisfies at least one of the following conditions:

$$100° < FOV < 200° \quad \text{Condition (1)}$$

$$1 < TTL/\text{ImgH} < 2 \quad \text{Condition (2)}$$

where FOV denotes an angle of view of the lens optical system, TTL denotes a distance from an incidence surface of the first lens to the image sensor, and ImgH denotes a diagonal length of a maximum pixel region of the image sensor.

17. The lens optical system of claim 15, wherein the lens optical system satisfies at least one of the following conditions:

$$0 \leq TL4L5 \leq 0.03 \quad \text{Condition (3)}$$

$$0.15 < (TL1 + TL2 + TL1L2)/OAL < 0.4 \quad \text{Condition (4)}$$

$$0.7 < Nd1/Nd5 < 0.95 \quad \text{Condition (5)}$$

$$2 < Abv1/Abv5 < 4 \quad \text{Condition (6)}$$

where TL4L5 (unit: mm) denotes a distance between the fourth lens and the fifth lens, TL1 denotes a center thickness of the first lens, TL2 denotes a center thickness of the second lens, Tl1L2 denotes a distance between the first lens and the second lens, OAL denotes a distance from a center of the incidence surface of the first lens to a center of an exit surface of the fifth lens, Nd1 denotes a refractive index of the first lens, Nd5 denotes a refractive index of the fifth lens, Abv1 denotes an Abbe number of the first lens, and Abv5 denotes an Abbe number of the fifth lens.

18. The lens optical system of claim 15, wherein the first to fifth lenses are glass lenses.

* * * * *

UNITED STATES PATENT AND TRADEMARK OFFICE
CERTIFICATE OF CORRECTION

PATENT NO. : 10,838,167 B2
APPLICATION NO. : 16/083388
DATED : November 17, 2020
INVENTOR(S) : Jung et al.

Page 1 of 1

It is certified that error appears in the above-identified patent and that said Letters Patent is hereby corrected as shown below:

In the Claims

Column 14, Claim 17, Line 65, "Tl1L2" should be "TL1L2"

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*